US009246883B2

(12) United States Patent
Holtmanns et al.

(10) Patent No.: US 9,246,883 B2
(45) Date of Patent: Jan. 26, 2016

(54) SUBSCRIBER IDENTITY MODULE PROVISIONING (75) Inventors: Silke Holtmanns, Klaukkala (FI); Marc Richarme, Copenhagen (DK); Thomas Kumpf, Laichingen (DE)

(73) Assignee: Nokia Technologies Oy, Espoo (FI)

( * ) Notice: Subject to any disclaimer, the term of this patent is extended or adjusted under 35 U.S.C. 154(b) by 315 days.

(21) Appl. No.: 13/359,860

(22) Filed: Jan. 27, 2012

(65) Prior Publication Data
US 2012/0196569 A1 Aug. 2, 2012

Related U.S. Application Data (60) Provisional application No. 61/437,752, filed on Jan. 31, 2011.

(51) Int. Cl.
*H04W 4/00* (2009.01)
*H04L 29/06* (2006.01)
(Continued)

(52) U.S. Cl.
CPC .......... *H04L 63/0428* (2013.01); *H04L 63/08* (2013.01); *H04W 12/04* (2013.01); *H04W 12/06* (2013.01)

(58) Field of Classification Search
CPC ....... H04W 4/00; H04W 4/001; H04W 4/003; H04W 4/02; H04W 4/185; H04W 4/24; H04W 4/26; H04W 12/02; H04W 12/04; H04W 12/06; H04W 12/08; H04W 12/10; H04W 12/12; H04W 8/18
See application file for complete search history.

(56) References Cited

U.S. PATENT DOCUMENTS

2004/0029576 A1* 2/2004 Flykt et al. .................. 455/422.1
2004/0158618 A1* 8/2004 Shaw ............................ 709/217
2006/0262914 A1* 11/2006 Cai ........................... 379/114.16
(Continued)

FOREIGN PATENT DOCUMENTS

CN 101237617 A 8/2008
KR 20100057733 A 6/2010
(Continued)

OTHER PUBLICATIONS

"Smart Cards; Secured packet structure for Uicc based applications (Release 9)", ETSI TS 102 225 V9.0.0, Apr. 2010, 22 pgs.
(Continued)

*Primary Examiner* — San Htun
(74) *Attorney, Agent, or Firm* — Harrington & Smith (57) ABSTRACT The exemplary embodiments of the invention include inputting, at a device, a voucher having a plurality of data fields, where the voucher provides provisional subscriber identification for the device, sending at least some of the voucher data fields to a network operator, based on the sent information, receiving a software based subscriber identity module, and using the software based subscriber identity module to authenticate the device. Further, the exemplary embodiments include receiving a voucher having a plurality of data fields from a device, where the voucher provides provisional subscriber identification for the device, in response to the voucher code, sending to the device a request for additional information, in response to the request, receiving an additional data field of the voucher and a security identifier of the device, and based on validating the additional information using the security identifier, sending a software based subscriber identity module to the device.

16 Claims, 6 Drawing Sheets (51) Int. Cl.
*H04W 12/06* (2009.01)
*H04W 12/04* (2009.01)

(56) References Cited

U.S. PATENT DOCUMENTS

| | | | |
|---|---|---|---|
| 2008/0260149 A1 | 10/2008 | Gehrmann | 380/247 |
| 2008/0270302 A1* | 10/2008 | Beenau et al. | 705/42 |
| 2009/0061839 A1* | 3/2009 | Zimmerman et al. | 455/419 |
| 2009/0194582 A1 | 8/2009 | Ye | |
| 2009/0205028 A1 | 8/2009 | Smeets et al. | 726/6 |
| 2009/0239503 A1 | 9/2009 | Smeets | 455/411 |
| 2010/0029247 A1* | 2/2010 | De Atley et al. | 455/411 |
| 2010/0056102 A1* | 3/2010 | Chan et al. | 455/406 |
| 2011/0159843 A1* | 6/2011 | Heath et al. | 455/411 |

FOREIGN PATENT DOCUMENTS

| | | |
|---|---|---|
| WO | WO 02058361 A2 | 7/2002 |
| WO | WO 2009092115 A2 | 7/2009 |
| WO | WO-2009/103622 A1 | 8/2009 |

OTHER PUBLICATIONS

"Smart Cards; Remote APDU structure for UICC based applications (Release 9)", ETSI TS 102 226 V9.2.0, Apr. 2010, 43 pgs.

International Search Report and Written Opinion for corresponding patent application No. PCT/FI2012/050019 filed Jan. 11, 2012, mailed Apr. 25, 2012.

Husain S. et al. 'Remote device management of WiMAX devices in multi-mode multi-access environment'. In: 2008 IEEE International Symposium on Broadband Multimedia Systems and Broadcasting. Edited by A. Hornsby et al. Piscataway, NJ, USA: IEEE, Mar. 31, 2008, p. 1-14; p. 10-12, section 'Software SIM Installation using Hot-lining'; fig. 7.

Kasper, Michael, et al.; "Subscriber Authentication in Cellular Networks with Trusted Virtual SIMs," Franhofer-Institute for Secure Information Technology SIT; Feb. 17-20, 2008, ICACT, pp. 903-908.

3GPP TR 33.812 V9.2.0 (Jun. 2010), 3rd Generation Partnership Project; Technical Specification Group Services and System Aspects; Feasibility study on the security aspects of remote provisioning and change of subscription for Machine to Machine (M2M) equipment (Release 9) (87 pages).

* cited by examiner

SUBSCRIBER IDENTITY MODULE PROVISIONING

CROSS-REFERENCE TO RELATED APPLICATIONS

This patent application claims priority under 35 U.S.C. §119(e) from Provisional Patent Application No. 61/437,752 which was filed Jan. 31, 2011, the disclosure of which is incorporated by reference herein in its entirety.

TECHNICAL FIELD

The teachings in accordance with the exemplary embodiments of this invention relate generally to enabling a user to acquire a software based SIM, such as for a prepaid subscription, over the airwaves or via network connection, such as the Internet, or over any wired or wireless communication medium.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AAA authentication authorization accounting center
AUC authentication center
AUTN authentication token
CK confidential key
I-CSCF interrogating call session control function
IK integrity key
IMSI international mobile subscriber identity
HLR home location register
HSS home subscriber server
MAP mobile application part
MCC mobile country code
MCN mobile network code
MNO mobile network operator
OMA_DM open mobile alliance device management
OTA over-the-air
RAN radio access network
RAND random challenge in authentication
SIM subscriber identity module
SMS short message service
SW-SIM software subscriber identity module
VLR visitor location register
VNO visiting network operator
XRES expected response in authentication The use of mobile equipment in a specific type of mobile network generally requires that the user of the mobile equipment has a subscription. The mobile equipment may be any type of machine enabled to utilize a mobile network provided it has sufficient access credentials. The subscription identifies, among other things, the mobile network, in which the mobile equipment is to be used and the individual settings relating to the subscription. These setting can include a network operator setting and the subscriber identifier of an end user. The user might be an individual user, but may also be a corporation.

According to conventional methods, the subscription data may be recorded on a small chip on which at least memory areas are arranged for protecting the sensitive parts of the aforementioned settings and loading them into the mobile equipment being used. In addition, this subscription data may be encoded on a microcontroller operating as the processor unit for a device. Such a device is generally called a Subscriber Identity Module (SIM). The SIM is usually placed in a compact package generally referred to as a SIM card. The form factor of the SIM may be an embedded chip, a platform mounted chip, a logical unit on a larger processor, a protected memory card or a smart card. The chip may hold one or more sets of subscriptions or applications.

A generally compatible location is arranged for the SIM card in a device, such as mobile equipment, in which contacts studs are arranged to connect the card electrically to the mobile equipment. The general construction of the SIM card includes not only a possible microcontroller, as indicated above, but also various memory devices and auxiliary circuits, which relate to things such controlling data transfer and the power supply.

However, at least one problem exists in the conventional system in that a SIM may not be provided with newly acquired mobile equipment. In this case, a user will have to separately obtain the access credentials for the acquired mobile equipment. This can cause an inconvenience to the user for at least the reason that obtaining either the SIM card or the SIM download may require that the user bring the mobile equipment to a dealer who is associated with an operator of the user's choice. In addition, for costs reasons, design reasons or to reduce a risk of theft, mobile equipment may not be equipped with a card slot. In this case, in order to obtain a the access credentials they would need to be downloaded directly from the preferred operator or else by bringing the mobile equipment to a dealer that is directly connected to that operator. The word SIM data or access credentials can be understood as referring to not only the cryptographic secret but also to the related cryptographic data like an algorithm, and also operator specific settings such as for network access.

SUMMARY

In an exemplary aspect of the invention, there is a method comprising inputting, at a device, a voucher having a plurality of data fields, where the voucher provides provisional subscriber identification for the device, sending at least some of the voucher data fields to a network operator, based on the sent information, receiving a software based subscriber identity module, and using the software based subscriber identity module to authenticate the device.

In an exemplary aspect of the invention, there is a computer readable memory encoded with computer program code, the computer program code executed by at least one processor to perform actions comprising inputting, at a device, a voucher having a plurality of data fields, where the voucher provides provisional subscriber identification for the device, sending at least some of the voucher data fields to a network operator, based on the sent information, receiving a software based subscriber identity module, and using the software based subscriber identity module to authenticate the device.

In another exemplary aspect of the invention, there is an apparatus comprising at least one processor, and at least one memory including computer program code, where the at least one memory and the computer program code are configured, with the at least one processor, to cause the apparatus to at least input, at a device, a voucher having a plurality of data fields, where the voucher provides provisional subscriber identification for the device, send at least some of the voucher data fields to a network operator, based on the sent information, receive a software based subscriber identity module, and use the software based subscriber identity module to authenticate the device.

In an exemplary aspect of the invention, there is an apparatus comprising means for inputting, at a device, a voucher having a plurality of data fields, where the voucher provides provisional subscriber identification for the device, means for sending at least some of the voucher data fields to a network operator, means, based on the sent information, for receiving a software based subscriber identity module, and means for using the software based subscriber identity module to authenticate the device.

In an exemplary aspect of the invention, there is a method comprising receiving a voucher having a plurality of data fields from a device, where the voucher provides provisional subscriber identification for the device, in response to the voucher code, sending to the device a request for additional information, in response to the request, receiving an additional data field of the voucher and a security identifier of the device, and based on validating the additional information using the security identifier, sending a software based subscriber identity module to the device.

In yet another exemplary aspect of the invention, there is a computer readable memory encoded with computer program code, the computer program code executed by at least one processor to perform actions comprising receiving a voucher having a plurality of data fields from a device, where the voucher provides provisional subscriber identification for the device, in response to the voucher code, sending to the device a request for additional information, in response to the request, receiving an additional data field of the voucher and a security identifier of the device, and based on validating the additional information using the security identifier, sending a software based subscriber identity module to the device.

In an exemplary aspect of the invention, there is an apparatus comprising at least one processor, and at least one memory including computer program code, where the at least one memory and the computer program code are configured, with the at least one processor, to cause the apparatus to at least receive a voucher having a plurality of data fields from a device, where the voucher provides provisional subscriber identification for the device, in response to the voucher code, sending to the device a request for additional information, in response to the request, receiving an additional data field of the voucher and a security identifier of the device, and based on validating the additional information using the security identifier, of sending a software based subscriber identity module to the device.

In still another exemplary aspect of the invention, there is an apparatus comprising means for receiving a voucher having a plurality of data fields from a device, where the voucher provides provisional subscriber identification for the device, means, in response to the voucher code, for sending to the device a request for additional information, means, in response to the request, for receiving an additional data field of the voucher and a security identifier of the device, and means, based on validating the additional information using the security identifier, for sending a software based subscriber identity module to the device.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

As was stated above, a problem exists in the conventional methods where a user who acquires a mobile equipment which does not contain a SIM card may have to bring the mobile equipment to a dealer who is associated or is directly connected to an operator of the user's choice in order to purchase SIM data and/or download SIM data for the mobile equipment over some form of connectivity, for example a WLAN, cable, or cellular network.

It would therefore be desirable to provide at least a technique that enables a user to acquire for a device a software based SIM over the airwaves or via network connection, such as the Internet, or over any wired or wireless communication medium. The SIM card contains data, which is basically software. The data on the SIM card (SIM data) can also be acquired via some other form factor, such as a form factor operable for provisioning the SIM data to a mobile equipment (i.e., software based SIM). This provisioning of the SIM data can be, for example, for providing a prepaid subscription for a user of the mobile equipment.

Further, it is known that conventional methods may exist to enable signaling the SIM data over the air (OTA) to update an IMSI and SIM data of a device. According to the conventional methods this may be accomplished by a network operator who is provisioning the SIM data. However, the exemplary embodiments of the invention, as described below provide at least a novel improved method for the handling and usage of a network code including a voucher with pre-paid coding for use as a 'virtual' IMSI for a first contact to an operator. In accordance with the exemplary embodiments of the invention, this first contact can be performed even via another different network operator. The network where the mobile equipment is first activated to obtain the SIM data might not be the one the user desires to obtain the SIM data from or the network that is provisioning the SIM data. But on the other hand, a network, such as a cellular network, will only grant access and connectivity when a valid IMSI is presented. The network operator that is contacted first by the mobile equipment has little incentive to change his network to support this provisioning from another network operator. Hence a method is provided that does not require complex business agreements between operators and that minimizes changes or processes required by the network operator that is contacted first in order to support provisioning SIM data from a different network operator, such as one the user desires.

Also, to initiate the SIM data provisioning a simpler mechanism is seen to be needed. The exemplary embodiments of the invention provide an improved method for over-the-air provisioning of a SIM data to mobile equipment.

Proposals related to providing virtual SIMS are disclosed in "3GPP TR 33.812 v9.2.0 (2010-06), 3rd Generation Partnership Project; Technical Specification Group Services and System Aspects; Feasibility study on the security aspects of remote provisioning and change of subscription for Machine to Machine (M2M) equipment (Release 9)."

With regards to conventional methods, M. Kasper, N. Kuntze, and A. U. Schmidt have proposed a virtual SIM system based on the Mobile Trusted Module (MTM) specified by the Trusted Computing Group (TCG) in their paper: "Subscriber authentication in cellular networks with trusted virtual SIMs," in Proceedings of the 10th International Conference on Advanced Communication Technology, (Phoenix Park, Korea), IEEE, February 2008. However, their proposed system has certain drawbacks. Apart from its complexity, it has other problems making it conflict with the actual needs of such a system. First, the point of sale of the subscription needs to communicate with the mobile operator in order to activate the subscription once it is sold to the user, which is a problem when subscriptions are not sold in operator-owned stores, e.g. supermarkets, gas stations or other general purpose stores. In those cases, the stores would need to have a secure connection to all the operators for whom they sell subscriptions. Furthermore, the stores would need special equipment since they are required to interface with the handset, which means that staff needs to be trained in using it. Further, subscriptions cannot be pre-activated, since the activation step transfers the user's certificate to the operator.

In accordance with the exemplary embodiments, when a pre-paid subscription to an operator's network is not included with a mobile equipment (ME), or a pre-paid subscription is separately acquired for the ME, then instead of receiving a physical SIM card for the pre-paid subscription a pre-paid voucher code is provided to the user. The voucher code is associated with a software based SIM, hereafter referred to for convenience as a soft-SIM or as a virtual (v)-SIM or as an e-SIM, to be used with the ME.

When the ME is first acquired it may not be associated with a network provider or operator and/or may not be assigned an international mobile subscriber number (IMSI). In accordance with the exemplary embodiments of the invention there is an over the air (OTA) provisioning of the soft-SIM. It is noted that although the embodiments of the invention, as described below, may focus on the pre-paid model these embodiments are not limited to pre-paid services. The embodiments of the invention may be used for any operation which includes acquiring a soft-SIM.

Figure 1:
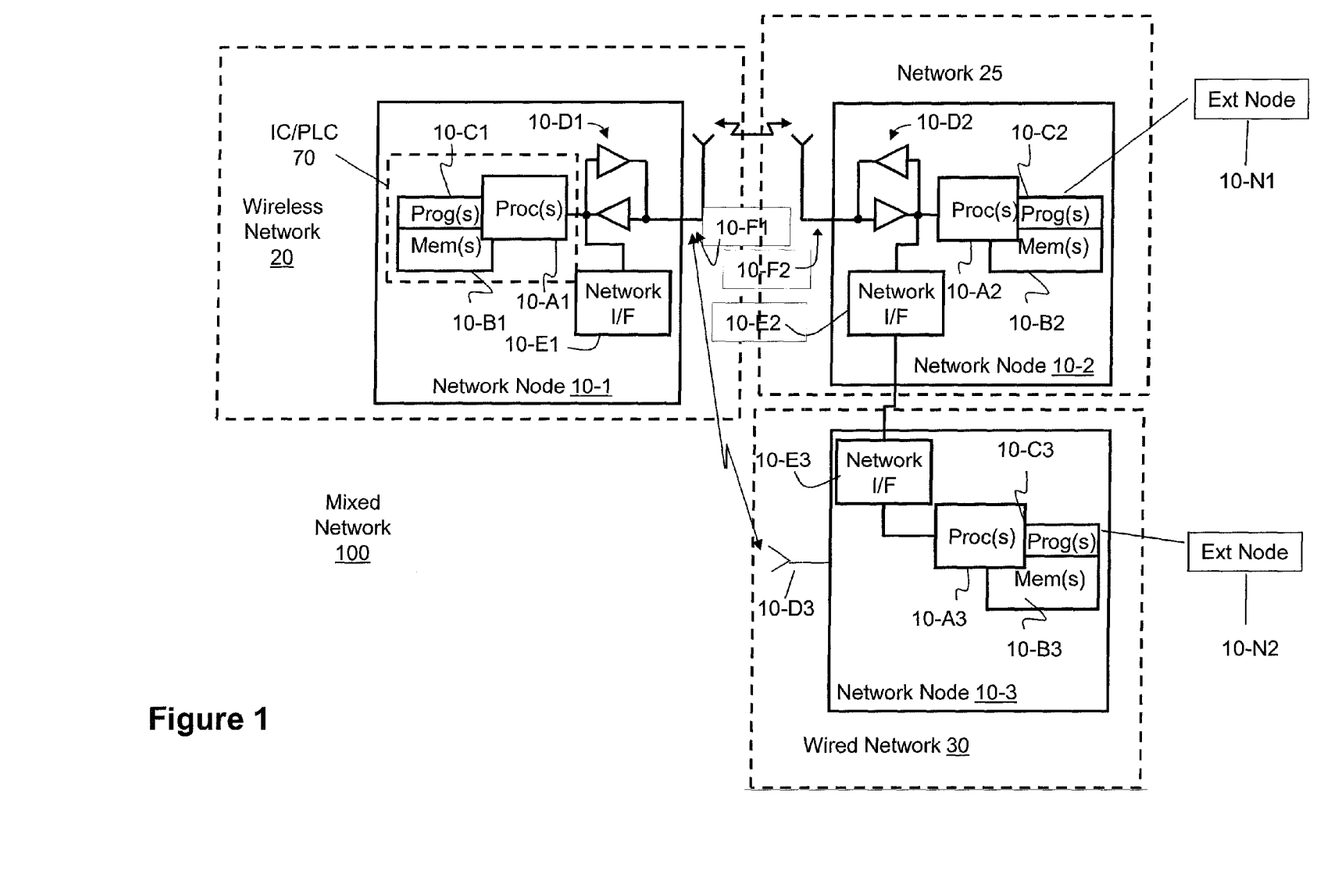
FIG. 1 shows a simplified block diagram of various electronic devices that are suitable for use in practicing the exemplary embodiments of this invention.

FIG. 1 illustrates an overview of one environment where the exemplary embodiments of the invention for soft-SIM provisioning may be practiced. FIG. 1 is a block diagram having a number of network nodes 10 communicating in a mixed network 100. The mixed network 100 includes a wireless network 20, a wireless/wired network 25, and a wired network 30. The network 20 and 25 includes network nodes 10-1 and 10-2, respectively, in wireless communication. The wired network 30 includes network node 10-2 and 10-3 in wired communication. The network node 10-1 includes one or more processors 10-A1, one or more memories 10-B1 containing one or more programs 10-C1, a radio frequency transceiver 10-D1 able to receive and transmit data, a wired network interface 10-E1, and one or more antennas 10-F1. Similarly, the network node 10-2 includes one or more processors 10-A2, one or more memories 10-B2 containing one or more programs 10-C2, a radio frequency transceiver 10-D2 able to receive and transmit data, a wired network interface 10-E2, and one or more antennas 10-F2. In the example of FIG. 1, the network node 10-3 includes one or more processors 10-A3, one or more memories 10-B3 containing one or more programs 10-C3, a wired network interface 10-E3.

In addition, the network nodes 20, 25, and 30 can each include a soft SIM module 10-G1, 10-G2 and 10-G3, respectively, to perform the operations in accordance with the exemplary embodiments of the invention. For instance, either of the network nodes 10-1 and 10-2 could be a base station, or mobile equipment such as a cellular phone or other cellular device, and the network node 10-2 could be a network such as a first network also referred to sometimes as a visiting network operator (VNO) (i.e., the network where a device seeks first connectivity for SIM data provisioning). Further, the network nodes 10-2 and 10-3 could be network nodes such as for a VNO and/or a home network of particular mobile equipment. Further, as illustrated there may be a wireless connection 10-D3 established between the network node 10-1 and the wired network 30, as well as a wired connection between the network node 10-2 and the wired network 30. Any of these connections may be used for communications in accordance with the exemplary embodiments of the invention.

In addition, the network node 10 and the wired network 30 may utilize external network nodes 10-N1 and 10-N2, respectively. The external nodes may each comprise VLR and/or database functionalities for use with at least the SIM data provisioning. Further, the external Nodes 10-N1 and 10-N2 can each include at least the special programming, memory, processors, and/or circuitry included in any of the soft SIM modules 10-G1, 10-G2 and 10-G2, as described above, to perform the exemplary embodiments of the invention. As another example, each of the network nodes 10 could be a computer in a wired network. FIG. 1 is merely illustrative of possible devices suitable for use with soft-SIM provisioning.

As shown in FIG. 1, there exist several interconnections between the network parts shown by corresponding arrows or lines. These interconnections may be established by means of interfaces or reference points which may be different in dependence of the employed network technology and which are known to those skilled in the art.

In accordance with the exemplary embodiments of the invention, the ME, for example the network nodes 10-1 or 10-2 can download a Soft-SIM (v-SIM or e-SIM) using a voucher code. The voucher code can be cash prepaid and be bought in a shop, or for roamers could be acquired via an internet web page of the operator. Further, the exemplary embodiments of the invention address how the ME can contact a network operator that issued the voucher code, or is only provisioning the soft-SIM, in order to securely download the soft-SIM. This feature is especially important if the network that the ME initially connects to (where the device is initially switched on) is not the network of the operator who provided the voucher code. This initial network would, by conventional procedures, need to identify and obtain the needed authentication credentials from the ME.

For example, for the case that the network node 10-1 is the ME and the network node 10-2 is the network which provisions the soft-SIM, then the ME (or network node 10-1) can acquire the soft-SIM directly from the network node 10-2. In addition, for the case that the network node 10-1 is the ME and the network node 10-2 is a visiting network operator (VNO) then the ME can communicate with the network which provisions the soft-SIM via the network node 10-2. In this case the network which provisions the soft-SIM can be the wired network 30 or even be another wireless network which the network node 10-2 can communicate with to facilitate acquiring the soft-SIM for the ME.

Further, the exemplary embodiments of the invention provide a novel method for at least the handling and usage of a network code and part of pre-paid code [PrepaidCodePart1] as a 'virtual' IMSI for first contact to the home operator. In accordance with the exemplary embodiments of the invention the voucher code may comprise digits and a structure as follows:

[MCC][MNC][PrepaidCodePart1][PrepaidCodePart2]

The combination of the sections (e.g., data fields) [MCC], [MNC] and [PrepaidCodePart1] form a valid IMSI. The MCC and MNC are 5 digits long combined, and the PrepaidCodePart1 corresponds to the MSIN part of the IMSI which is 9 digits. The security of the sections [PrepaidCodePart1] [PrepaidCodePart2] can be handled in the same way as for conventional pre-paid top-up cards/codes.

The following steps outline some of the procedures with regards to a phone. The phone has a device certificate in accordance with the exemplary embodiments of the invention:

[1] User switches phone on.
[2] User obtaining a user interface for voucher insertion.
[3] User inserts the voucher (MCC.MNC.PrepaidCodePart1.PrepaidCodePart2) either directly as a number code or using a camera and bar-code or using near field communication technologies or Bluetooth (as non-limiting examples). The structure of the voucher is given above. It is noted that optionally, the prepaid number in the next step is encrypted with the public key of that operator. This option employs a pre-installed list of public key certificates in the device, for example a MCC.MNC—certificate list. The MCC.MNC uniquely identifies an operator anywhere in the world and is typically used for roaming purposes.
[4] The device now sends to the network the MCC.MNC.PrepaidCodePart1 of the voucher code as it would in a normal authentication run. The (encrypted) first part of the prepaid number would then serve as the IMSI for the device.
[5] The receiving local network operator sees the MCC.MNC and uses an interface, such as a normal roaming interface from its VLR, to the AUC of the MCC.MNC operator and sends the "IMSI."
[6] The AUC of the MCC.MNC detects that this IMSI is not in its standard AUC/HSS/HLR subscriber database. In accordance with the exemplary embodiments the PrepaidCodePart1 may be given a structure that could be uniquely distinguished from other subscriber IMSI numbers. The AUC then (optionally decrypts and) checks the received prepaid code.
[7] Then the AUC sends to the local network operator a message that this is a "provisioning case". The knowledge that this is a provisioning case implies that the local network operator can apply restrictions, such as for service usage, to this user.
[8] The local network operator recognizes that this is a provisioning message from the AUC. As such, the local network sets the user to be "authenticated to the Radio Access Network (RAN) and authorized to receive the provisioning message and to send the device certificate."
[9] The device receives for example, an SMS instructing it to send the PrepaidCodePart2 (that may have been previously inserted by user)+device certificate+device information. The device automatically responds with the requested information. It should be noted that the entire voucher code may have been already entered into the device by the user. The device is operable to cache the PrepaidCodePart2 for this step. Optionally, an SMS received by the device contains the public key certificate of the MCC.MNC operator. The provided public key is then used by the device to encrypt the response SMS, thereby protecting the PrepaidCodePart2 from interception. This aids in preventing fraud. As a delivery mechanism also IP connectivity can be deployed, depending on network capability.
[10] The local network operator forwards the contents of the response SMS to the selected home operator (in particular to a provisioning server there).
[11] After validating that the PrepaidCodePart2 corresponds to the same voucher, the home operator sends one or several SMS messages with the SIM-data-provisioning packet or a link to download the data (such as for packet connection). So that the user can use the subscription (and SIM data), the operator needs provides the SIM data from the subscriber database to the server that is performing the provisioning. Alternatively the provisioning server can put the SIM data in the subscriber database when it is acquired. This interaction between the provisioning server and subscriber database can be as an extension to the normal MAP message which contains the RAND, AUTN, XRES, CK and IK. The home operator then installs this user in his database of authorized users, i.e., those users authorized to use the network according to the operator policy for this subscriber type.
[12] The SMS is sent through an unsecured channel, it is noted that possibly due to the OMA_DM packet structure the data may already be protected (OMA_DM packet structure information may be found in the ETSI standards documents ETSI TS 102 225 V9.0.0 (2010-04) and ETSI TS 102 226 V9.2.0 (2010-04)). Additionally, this channel is preferably not secured because the device would not have the possibility to decrypt it, if the normal radio encryption is added.
[13] The device installs the soft-SIM and performs a normal network authentication procedure.
[14] The home operator then indicates in its database of authorized uses that this subscription is "fully active".

Figure 2:
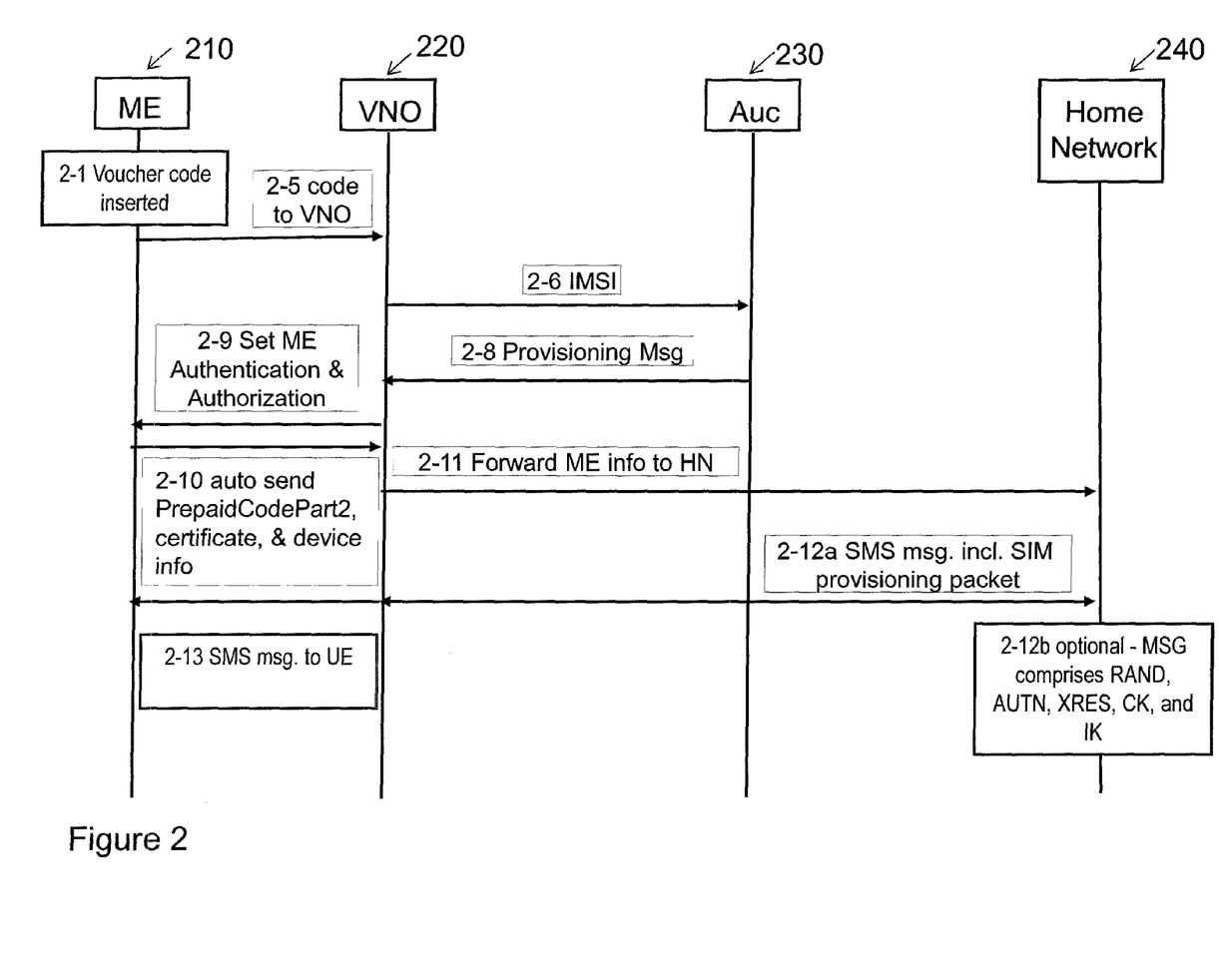
FIG. 2 shows an exemplary message sequence chart showing one possible signaling flow.

FIG. 2 illustrates similar steps as described above. In particular FIG. 2 illustrates a format for obtaining the soft-SIM in situations where mobile equipment (ME) 210 initially connects to a VNO 220, as for example the network node 10-2. The VNO 220 may be operating using its roaming interfaces as much as possible. It can be assumed that the VNO 220 first uses the roaming interfaces in a normal fashion and then takes into account some add-ons for the receiving and transfer of the v-SIM (the VNO may be only a bit pipe or data facilitator for at least some of these operations). Further, the mobile equipment may connect to the home network or the network which provided the soft-SIM to the mobile equipment. It is noted that in accordance with the exemplary embodiments the message flow as described above and illustrated in FIG. 2 can be IP based messaging (i.e. provisioning via IP cellular) or SMS, or a combination of both.

In FIG. 2, at step 2-1 the ME 210 is connecting with a local network operator, in this case the VNO 220. It is noted that the ME 210 has a device certificate. In addition, the ME 210 includes at least one interface for voucher insertion (example in FIG. 1). At step 2-1 the voucher is entered at the ME 210 by any suitable manner. The structure of the voucher, as identified above, is MCC.MNC.PrepaidCodePart1.PrepaidCodePart2. As was also stated above, the combination of the sections [MCC], [MNC] and [PrepaidCodePart1] form a valid "IMSI for the ME" for use by the ME in acquiring a soft-SIM. Optionally, a part of the voucher, such as the PrepaidCodePart1 and/or the PrepaidCodePart2, may be encrypted. The encryption uses a public key of a particular operator that the ME is communicating with. In order to perform this encryption the ME 210 preferably includes a pre-installed certificate or certificate list. Such a certificate list would include certificates associated with at least the MCC.MNC as identified in the voucher. At step 2-5 the ME 210 sends the MCC.MNC.PrepaidCodePart1 of the voucher code. This (encrypted) first part of the prepaid number would serve as the "IMSI for the ME". At step 2-6, the VNO 220 sees the MCC.MNC and using an interface, such as a normal roaming interface from its VLR, send the "IMSI for the ME" to an AUC 230 for the MCC.

After receiving the voucher code, including the "IMSI for the ME", the AUC 230 may identify that this IMSI is not a typical IMSI of its database. In accordance with the exemplary embodiments of the invention, the PrepaidCodePart1 portion of the voucher has given a structure that uniquely distinguishes this IMSI of the voucher from other subscriber IMSI numbers which may be stored in the database for the AUC 230. In addition, in accordance with the exemplary embodiments, the voucher code including the MCC.MNC as the IMSI may be decrypted by the AUC 230 in order to check the prepaid code portion. At step 2-8, in response to the received "IMSI for the ME" the AUC 230 sends to the VNO 220 a message indicating that this IMSI is for a soft-SIM provisioning case. Based on this indication, the VNO 220 may apply restrictions to communications with the user of the ME, such as restrictions of service usage by the user. Further, as the VNO recognizes that this is a provisioning case at step 2-9 the VNO 220 sets the ME 210 to indicate authentication to the RAN and to indicate that the ME 210 is authorized to receive a provisioning message and to send a device certificate.

At step 2-10, in response to a received message such as an SMS message, the ME 210 automatically sends information including at least the PrepaidCodePart2 of the voucher. This information may be encrypted with the public key of the ME 210 or a public key associated with the home operator. Other requested information can be sent as well. It is noted that although the entire voucher may be entered at step 2-1 the PrepaidCodePart2 may be cached by the ME 210 for use in step 2-10. In addition, the message received by the ME in step 2-10 may contain a public key certificate of the MCC.MNC operator. In this case this public key would be used by the ME 210 to encrypt the response message, thereby protecting at least the PrepaidCodePart2 from interception and fraud. At step 2-11 the VNO 220 forwards the contents of the response from the ME 210 to an operator of a home network 240 for the ME 210. The home network 240 is the provisioning network identified by the voucher. The operator may be a node, such as a provisioning server, of the home network 240. At step 2-12a, after validating that the PrepaidCodePart2 corresponds to the same voucher, the home operator of the home network sends a message, such as an SMS message, with a SIM-provisioning packet. As indicated in step 2-12b this message from the home operator can be an extension to a normal mobile application part (MAP) message containing a random challenge in authentication (RAND), authentication token (AUTN), expected response in authentication (XRES), confidential key (CK), and integrity key (IK). Subsequently identification for the ME 210 is stored in a database serving the home network 240. It is noted that MAP can be used to define messages sent between network nodes such as mobile switches and databases to support user authentication, equipment identification, and roaming. Finally, at step 2-13 the message, such as an SMS message, including the SIM-provisioning packet is sent to the ME 210.

As was noted above the VNO 220 can function simply as a conduit or bit-pipe for the soft-SIM provisioning from the home network or provisioning network. Further, the exemplary embodiments of the invention may be performed while the ME 210 is connected directly to the home network.

Figure 3:
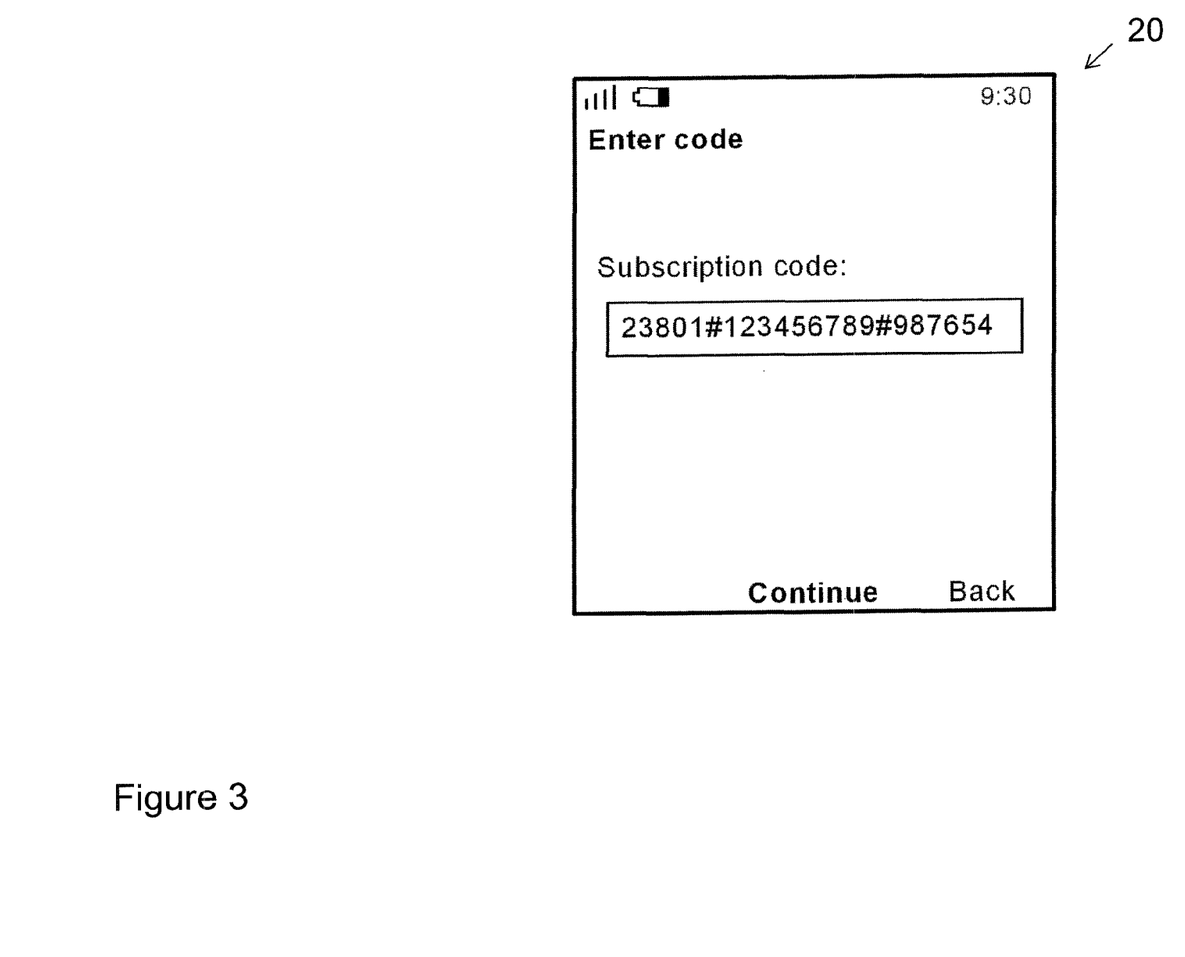
FIG. 3 shows a user interface display, wherein, in accordance with the exemplary embodiments, a voucher which has been entered is displayed.

FIG. 3 illustrates a user interface display 20 of the ME wherein, in accordance with the exemplary embodiments, a voucher and/or subscription code which has been entered is displayed.

Figure 4:
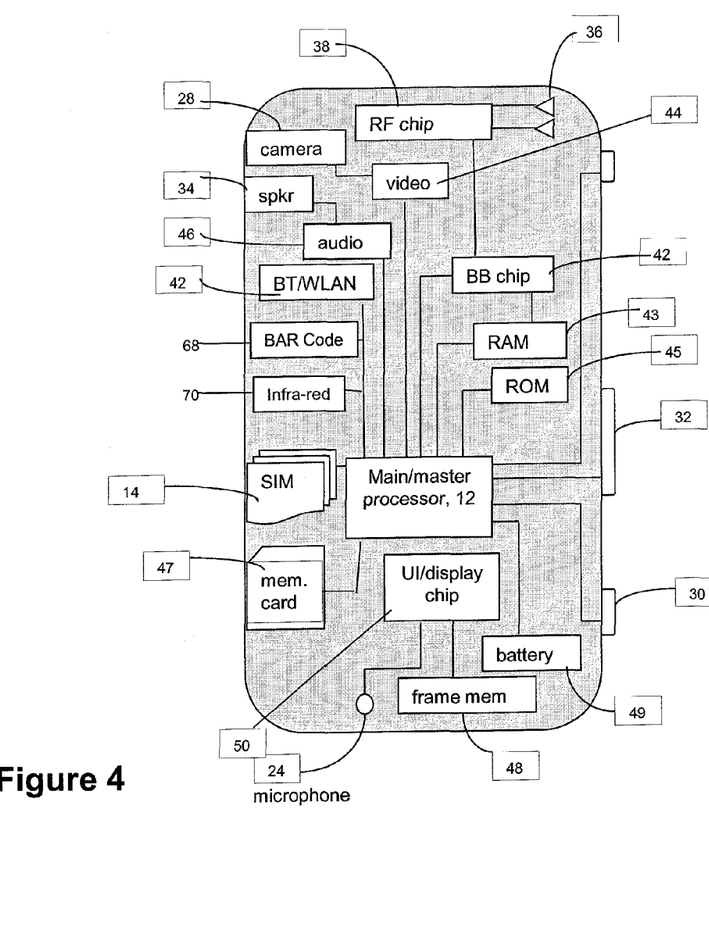
FIG. 4 shows a mobile device as one embodiment of a device for use in accordance with the exemplary embodiments of the invention.

Further details of an example ME is shown in both plan view (left) and sectional view (right) at FIG. 4. The ME 10 includes a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The example ME 10 may have a camera 28 controlled by a shutter actuator 30 and optionally by a zoom actuator 32 which may alternatively function as a volume adjustment for the speaker(s) 34 when the camera 28 is not in an active mode. In addition, the ME 10 may have a bar-code reader 64 and an infra-red sensor 66. Further, it is noted that in accordance with the exemplary embodiments the voucher code may be input by the user to the ME 10 using at least any of the user interface 22, the camera 28, the infra-red sensor 66, the bar-code reader 64 and the microphone 24 of the ME 10. In addition, in accordance with the exemplary embodiments, the voucher code can be acquired for and/or input to a device such as the ME 10 using an external or internal apparatus to produce a short range or long range radio signal, an image, a sound, a frequency of light, or a type of biometric reader input.

Also shown is a video processor 44, a separate audio processor 46, separate bar-code processor 68, infra-red processor 70, and speakers 34. The graphical display interface 20 is refreshed from a frame memory 48 as controlled by a user interface chip 50 which may process signals to and from the display interface 20 and/or additionally process user inputs from the user interface 22 and/or the camera 28, and/or the microphone 24 and/or the bar-code reader 64, and/or the infra-red sensor 66. Within the sectional view of FIG. 4 are seen multiple antennas 36 which may be transmit only, receive only or both transmit and receive antennas that are typically used for cellular and/or non-cellular communication or wireless connectivity and which may be implemented in any of the example environments, methods, or devices shown at FIGS. 1-3 and detailed above.

The signals received at the ME 10 are output to the RF chip 38 which demodulates and down converts the various signals for baseband processing. The baseband (BB) chip 42 detects the signal which is then converted to a bit-stream and finally decoded. Similar processing occurs in reverse for signals generated in the ME 10 and transmitted from it. There may be one or more secondary radios (Bluetooth or WLAN shown together as 42 but which may be RFID, GPS, and/or FM in other embodiments) which may or may not use embodiments of the invention. That is, a single host device such as the ME 10 may include multiple instances of the multi-band antenna according to these teachings.

Throughout the apparatus are various memories such as random access memory RAM 43, read only memory ROM 45, and in some example embodiments removable memory such as the illustrated memory card 47 on which various programs of computer readable instructions are stored. The aforesaid processors 38, 40, 42, 44, 46, 68, 79, 50, if embodied as separate entities in a ME 10, may operate in a slave relationship to the main processor 12, which may then be in a master relationship to them. Any or all of these various processors of FIG. 4 access one or more of the various memories, which may be on-chip with the processor or separate there-from. Note that the various chips (e.g., 38, 40, 42, etc.) that were described above may be combined into a fewer number than described and, in a most compact case, may all be embodied physically within a single chip.

In addition, there is a soft SIM module 14 coupled to at least the processor(s) and/or memory of the ME 10. The Soft SIM module 14 can include at least special programming, memory, processors, and/or circuitry to perform the novel operations with the ME 10, as well as operate with other network devices, such as via their soft SIM modules, as described above, and perform the exemplary embodiments of the invention. Further, in accordance with the exemplary embodiments, the memory card 47 may be used to provide the voucher to the ME 10. All of these components within the ME 10 are normally powered by a portable power supply such as a battery 49.

The embodiments of this invention may be implemented by computer software executable by the processors of the ME 10, and the processors of the Network Nodes 10-1, 10-2, and 10-3, such as the processors 10-A1, 10-A2, and 10-A3, or by hardware circuitry, or by a combination of software and hardware circuitry.

Figure 5:
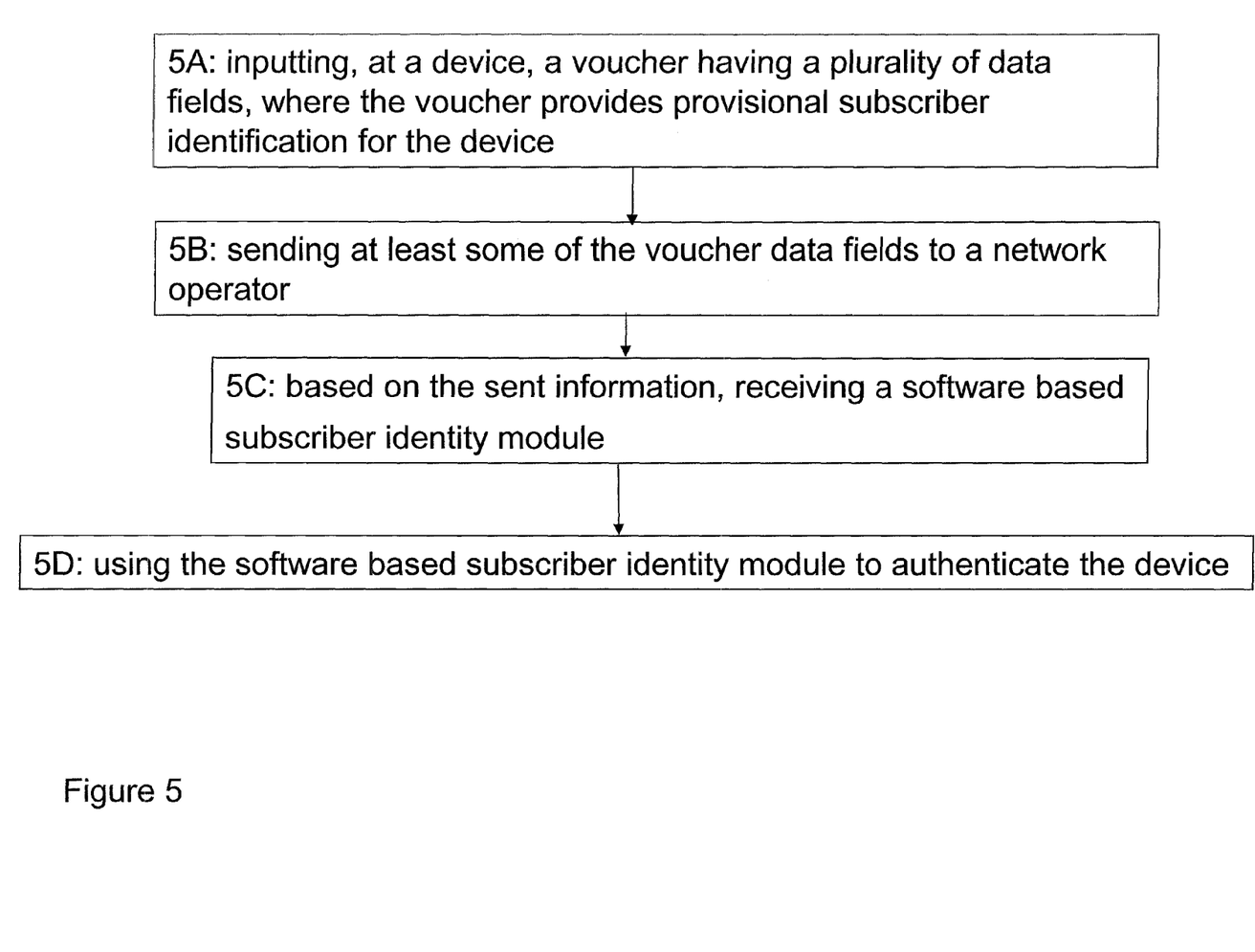
FIGS. 5 and 6 are each a logic flow diagram that illustrates the operation of a method and a result of execution of computer program instructions embodied on a non-transitory computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A there is a step of inputting, at a device, a voucher having a plurality of data fields, where the voucher provides provisional subscriber identification for the device. At step 5B there is a step of sending at least some of the voucher data fields to a network operator. At step 5C there is a step, based on the sent information, of receiving a software based subscriber identity module. And at step 5D there is a step of using the software based subscriber identity module to authenticate the device.

In accordance with the method shown in FIG. 5, where the software based subscriber identity module provides an international mobile subscriber identity for the device.

In accordance with the method shown in FIG. 5, where the data fields of the voucher comprise a mobile country code, a mobile network code, and a first prepaid code.

In accordance with the paragraph above, the method further comprising receiving a request for additional information; and sending a response with the additional information, where the response is encrypted using a public key certificate for the device.

In accordance with the paragraph above, where the additional information is a second prepaid code that comprises one of the voucher data fields.

In accordance with the paragraph above, where the request is received via a short message service.

In accordance with the method shown in FIG. 5, where the device is a mobile device.

In accordance with the method shown in FIG. 5, where the voucher is entered into the device via user interface of the device.

In accordance with the method shown in FIG. 5, where the network operator is a visiting network operator, where the software based subscriber identity module is received from a home network of the device, and where communication between the device and the home network for the software based subscriber identity module is via the visiting network operator.

Figure 6:
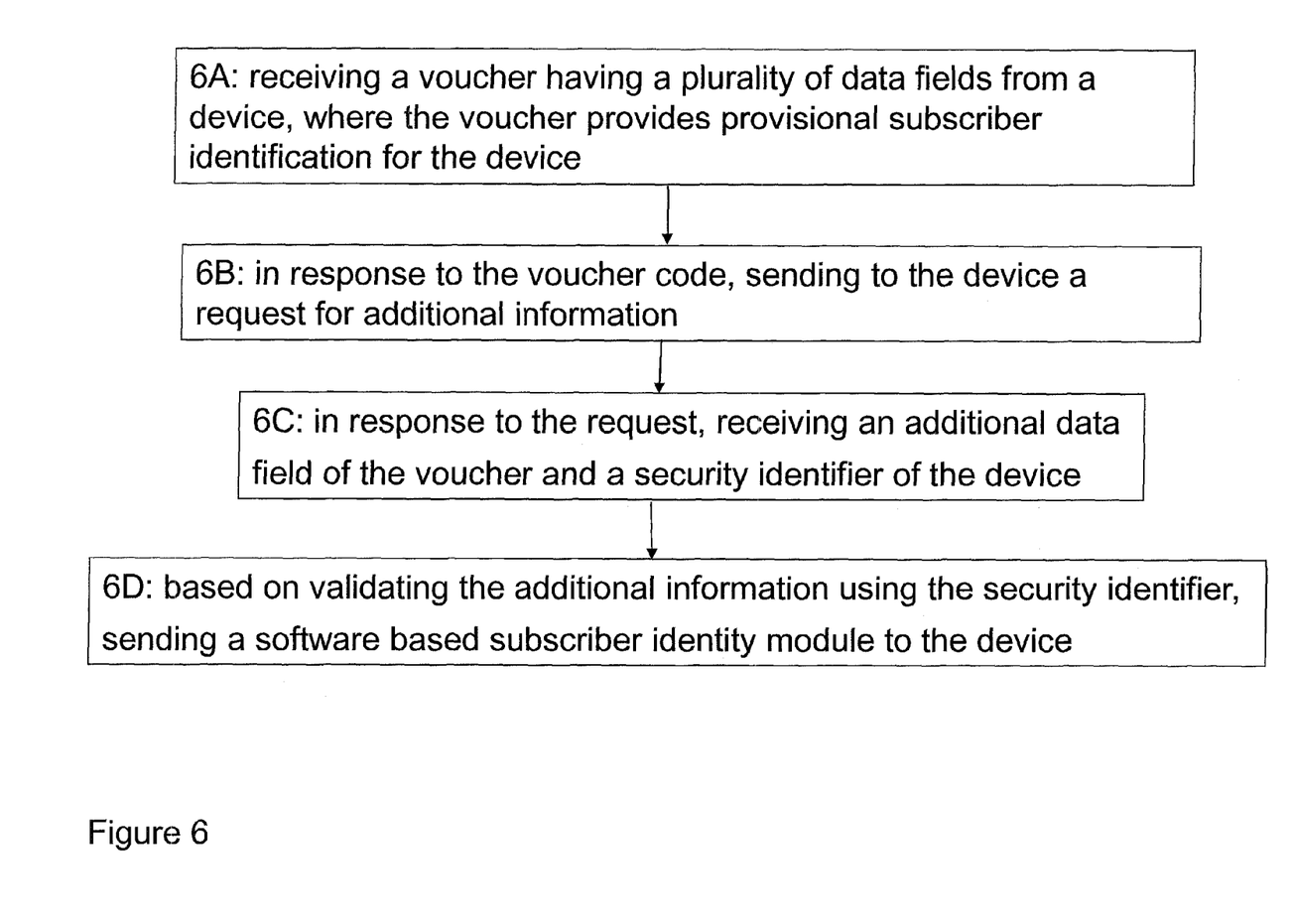

FIG. 6 is a logic flow diagram that illustrates the operation of a method, and a result of execution of computer program instructions, in accordance with the exemplary embodiments of this invention. In accordance with these exemplary embodiments a method performs, at Block 6A there is a step of receiving a voucher having a plurality of data fields from a device, where the voucher provides provisional subscriber identification for the device. At step 6B there is a step, in response to the voucher code, of sending to the device a request for additional information. At step 6C there is a step of in response to the request, receiving an additional data field of the voucher and a security identifier of the device. And at step 6D there is the step, based on validating the additional information using the security identifier, of sending a software based subscriber identity module to the device.

In accordance with the method shown in FIG. 6, where the voucher comprises a mobile country code, a mobile network code, and a first prepaid code.

In accordance with the paragraph above, where the security identifier is a public key certificate for the device, where the additional information is encrypted using the public key certificate, and where validating comprises decrypting the additional information with the public key certificate for the device.

In accordance with the paragraph above, where the additional data field is a second prepaid code.

In accordance with the paragraph above, where the request is sent via a short message service.

In accordance with the method shown in FIG. 6, where the device is a mobile device.

In accordance with the method shown in FIG. 6, where the voucher is received at a home network via visiting network operator to which the device is connected, and where communication between the home network for the software based subscriber identity module is via the visiting network operator.

Further in this regard it should be noted that the various blocks of the logic flow diagrams of FIGS. 5 and 6 may represent program steps, or interconnected logic circuits, blocks and functions, or a combination of program steps and logic circuits, blocks and functions for performing the specified tasks.

In addition, in accordance with the exemplary embodiments of the invention, there is an apparatus comprising means for inputting, at a device, a voucher having a plurality of data fields, where the voucher provides provisional subscriber identification for the device, means for sending at least some of the voucher data fields to a network operator, means, based on the sent information, for receiving a software based subscriber identity module, and means for using the software based subscriber identity module to authenticate the device.

Further, in accordance with the exemplary embodiments of the invention as at least described in the paragraph above, the means for inputting and the means for using comprises at least one processor, and where the means for sending and the means for receiving comprises at least one processor and an interface to the network operator.

Additionally, in accordance with the exemplary embodiments of the invention, there is there is an apparatus comprising means for receiving a voucher having a plurality of data fields from a device, where the voucher provides provisional subscriber identification for the device, means, in response to the voucher code, for sending to the device a request for additional information, means, in response to the request, for receiving an additional data field of the voucher and a security identifier of the device, and means, based on validating the additional information using the security identifier, for sending a software based subscriber identity module to the device.

In accordance with the exemplary embodiments of the invention as at least described in the paragraph above, the means for validating comprises at least one processor, and where the means for receiving and the means for sending comprises at least one processor and an interface to a wireless communication medium.

In general, the various embodiments of the mobile equipment can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Further, in accordance with the embodiments of the invention, the communications for the soft-SIM provisioning between a mobile equipment providing a voucher and a network node providing the soft-SIM may be performed using either wireless or wired connections, or a combination of both, as illustrated in FIG. 1.

The memories 10-B1, 10-B2, and 10-B3, as well as the memories of the ME 10 may be of any type suitable to the local technical environment and may be implemented using any suitable non-transitory data storage technology, such as semiconductor-based memory devices, magnetic memory devices and systems, optical memory devices and systems, fixed memory and removable memory. The data processors 10-A1, 10-A2, and 10-A3, including the processors of the ME 10, may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method comprising:
   inputting, at a user interface of a device, a voucher having a plurality of data fields, where the voucher provides provisional subscriber identification for the device;
   sending at least some of the voucher data fields towards a network operator, where the data fields of the voucher comprise a first prepaid code;
   receiving a request for additional information;
   in response to the request, sending a response with the additional information, where the additional information is a second prepaid code that comprises one of the voucher data fields;
   based on the second prepaid code being validated as corresponding to the voucher, receiving a software based subscriber identity module, where the voucher comprises at least one prepaid number code to form the software based subscriber identity module; and
   using the software based subscriber identity module to authenticate the device and activate a subscription with the network operator for the device.

2. The method according to claim 1, where the software based subscriber identity module provides an international mobile subscriber identity for the device.

3. The method according to claim 1, where the data fields of the voucher comprise a mobile country code, and a mobile network code.

4. The method according to claim 1, where the response is encrypted using a public key certificate for the device.

5. The method according to claim 1, where the request for the additional information is received in a short message service message.

6. The method according to claim 1, where the network operator is a visiting network operator, where the software based subscriber identity module is received from a home network of the device, and where communication between the device and the home network for the software based subscriber identity module is via the visiting network operator.

7. The method according to claim 1, where the device comprises a mobile device, and where the inputting comprises inputting the voucher with the user interface by a user of the mobile device.

8. The method according to claim 1, where the inputting at the user interface of the device is prompted by the device upon the device being initially switched on.

9. The a method according to claim 1, where the voucher comprises a mobile country code and a mobile network code.

10. A computer readable memory encoded with computer program code, the computer program code executed by at least one processor to perform the method according to claim 1.

11. An apparatus comprising:
   at least one processor; and
   at least one memory including computer program code, where the at least one memory and the computer program code are configured, with the at least one processor, to cause the apparatus to at least:
   input, at a user interface of a device, a voucher having a plurality of data fields, where the voucher provides provisional subscriber identification for the device;
   send at least some of the voucher data fields towards a network operator;
   receive a request for additional information;
   in response to the request, sending a response with the additional information, where the additional information is a second prepaid code that comprises one of the voucher data fields;
   based on the second prepaid code being validated as corresponding to the voucher, receive a software based subscriber identity module, where the voucher comprises at least one prepaid number code to form the software based subscriber identity module; and
   use the software based subscriber identity module to authenticate the device and activate a subscription with the network operator for the device.

12. The apparatus according to claim 11, where the software based subscriber identity module provides an international mobile subscriber identity for the device.

13. The apparatus according to claim 11, where the data fields of the voucher comprise a mobile country code, and a mobile network code.

14. The apparatus according to claim 11, where the response is encrypted using a public key certificate for the device.

15. The apparatus according to claim 11, where the request for the additional information is received in a short message service message.

16. The apparatus according to claim 11, where the network operator is a visiting network operator, where the software based subscriber identity module is received from a home network of the device, and where communication between the device and the home network for the software based subscriber identity module is via the visiting network operator.

* * * * *